United States Patent
Ilenda et al.

(10) Patent No.: US 6,861,475 B2
(45) Date of Patent: Mar. 1, 2005

(54) SMOOTH, FLEXIBLE POWDER COATINGS

(75) Inventors: Casmir Stanislaus Ilenda, Holland, PA (US); Michael Louis Spera, Mohnton, PA (US); Gordon Tullos, Reading, PA (US); Andrew T. Daly, Sinking Spring, PA (US)

(73) Assignee: Rohm and Haas Company, Philadelphia, PA (US)

( * ) Notice: Subject to any disclaimer, the term of this patent is extended or adjusted under 35 U.S.C. 154(b) by 127 days.

(21) Appl. No.: 10/323,121

(22) Filed: Dec. 18, 2002

(65) Prior Publication Data

US 2004/0077784 A1 Apr. 22, 2004

Related U.S. Application Data

(60) Provisional application No. 60/418,760, filed on Oct. 16, 2002.

(51) Int. Cl.$^7$ .......................... C08L 51/04; C08L 63/00; C08J 3/12
(52) U.S. Cl. ........................... 525/80; 525/85; 525/90; 525/65; 525/902
(58) Field of Search ............................ 525/80, 85, 90, 525/65, 902; 523/201

(56) References Cited

U.S. PATENT DOCUMENTS

| | | | | |
|---|---|---|---|---|
| 3,970,725 | A | | 7/1976 | Tugukuni et al. ............ 260/901 |
| 4,680,335 | A | | 7/1987 | Chambers et al. .......... 524/501 |
| 5,442,012 | A | * | 8/1995 | Kempner et al. ............. 525/71 |
| 5,470,893 | A | | 11/1995 | Sinclair-Day et al. ...... 523/205 |
| 5,856,377 | A | | 1/1999 | Sato et al. ................... 523/201 |
| 5,856,378 | A | | 1/1999 | Ring et al. ................... 523/205 |
| 5,908,877 | A | | 6/1999 | Ci et al. ...................... 523/201 |
| 5,959,029 | A | | 9/1999 | Koelliker et al. ............. 525/57 |
| 5,981,659 | A | | 11/1999 | Geck et al. .................. 525/100 |
| 6,031,047 | A | * | 2/2000 | Brady et al. .................. 525/64 |
| 6,084,009 | A | | 7/2000 | Mizoguchi et al. ......... 523/201 |
| 6,239,215 | B1 | | 5/2001 | Morita et al. .................. 525/65 |
| 6,346,292 | B1 | | 2/2002 | Grubb et al. ................ 427/195 |

FOREIGN PATENT DOCUMENTS

| | | |
|---|---|---|
| EP | 0 750 023 B1 | 12/1996 |
| EP | 0 945 495 A1 | 9/1999 |
| WO | WO 01/57144 A1 | 8/2001 |

OTHER PUBLICATIONS

Derwent World Patents Index—Abstract of JP 2000072986 A; date Mar. 7, 2000.
Derwent World Patents Index—Abstract of JP 9012926 A; date Jan. 14, 1997.
Derwent World Patents Index—Abstract of JP 7 188587 A; date Jul. 25, 1995.
Derwent World Patents Index—Abstract of JP 2000160061 A; date Jun. 13, 2000.
Derwent World Patents Index—Abstract of JP 2001288402 A; date Oct. 16, 2001.
Qian, Jy et al, Abstract of "Synthesis And Application Of Core–Shell Particles As Toughening Agents For Epoxies", Journal Of Applied Polymer Science, 58 (2): 439–448, Oct. 10, 1995.
Qian, Jy et al, Abstract of "The role of dispersed phase morphology on toughening of expoxies", Polymer, 38(1): 21–30, 01/97.
Sue, H.J. et al, Abstract of "Structure and property relationships in model diglycidyl ether of bisphenol–A and diglycidyl ether of tetramethyl bisphenol–A epoxy systems. I. Mechanical property characterizations", Journal Of Polymer Science Part B– Physics, 37(16):2137–2149, Aug. 15, 1999.

* cited by examiner

Primary Examiner—James J. Seidleck
Assistant Examiner—Olga Asinovsky
(74) Attorney, Agent, or Firm—Andrew E. C. Merriam

(57) ABSTRACT

The present invention, a powder composition for making powder coatings comprising one or more than one curable polymer or resin and an agglomerate of a core-shell polymer, wherein the agglomerate of a core-shell polymer has an average particle size of from 5 to 190 microns, preferably from 10 to 127 microns. The powders in accordance with the present invention provide a cured powder coating that is flexible, smooth, and which may be applied in a thickness of only from 0.3 to 8 mils. In a preferred embodiment of making a powder in accordance with the present invention, the agglomerate is cryoground to form a reduced agglomerate prior to adding it into a powder as a post-blend or a powder-forming mixture as a preblend. The preferred core-shell polymer for use in accordance with the present invention comprises an acrylic impact modifier having a poly (methyl methacrylate) shell and a poly(butyl acrylate) core. Further, the preferred curable polymer or resin powder is an epoxy resin, wherein the powder composition is a low temperature curing one component powder composition which cures at from 107 to 149 degrees C.

10 Claims, No Drawings

SMOOTH, FLEXIBLE POWDER COATINGS

CROSS REFERENCE TO RELATED PATENT APPLICATIONS

This is a non-provisional application of prior pending U.S. provisional application Ser. No. 60/418,760 filed Oct. 16, 2002.

FIELD OF THE INVENTION

The present invention relates to powder coating compositions containing core-shell flexibilizer additives and coatings made thereby. In particular, the present invention relates to powder compositions which yield smooth, flexible 0.5 to 8 mil powder coatings having excellent appearance properties and to powder coatings made from those compositions.

BACKGROUND OF THE INVENTION

Powder coatings for wood, plastics and other heat-sensitive substrates have posed several problems in the quality of the coating formed from the powder. For example, in coating wood substrates, in particular, medium density fiberboard or MDF, moisture in the substrates volatilizes before and during thermal cure of the coating and causes cracking in the resulting coating.

In heat resistant powder coatings, the heat resistant resin may become brittle with use at high temperatures. However, the art does not teach heat resistant coatings having improved elasticity upon use at high temperatures of greater than 200 degrees C.

Core-shell polymers having rubbery core and a hard shell, also known as impact modifiers, have been included into powder coatings to improve impact resistance. However, the impact modifiers in powder coatings have resulted in an undesirably seedy or bumpy appearance, even in films having a thickness of 10 mils or more which use a great deal of powder.

U.S. Pat. No. 6,239,215, to Morita et al., discloses powder coating compositions including a multi layer polymer particle, in which at least one inner layer is a polymer layer having a glass transition temperature (Tg) of not over 20 degrees C. and in which at least one outer layer has a Tg of not less than 60 degrees C., to improve the workability and impact resistance of a coating made from the composition. Morita et al. do not disclose any heat sensitive substrates or heat resistant resins. Further, the multilayer particles from made by Morita et al. agglomerate into large clumps having an average particle size of 200 microns or more. Accordingly, the Morita et al. powders must be coated in thicknesses of at least 200 microns or eight mils just to cover a single layer of the multilayer particles and would, thereby provide bumpy, rough coatings having "seeds" appearing therein.

The present inventors have discovered a powder coating composition which gives unexpectedly superior cracking resistance in coatings for heat sensitive substrates, despite outgassing during cure, as well as elasticity in heat resistant powder coatings. Further, the present inventors have discovered a flexibilized powder coating which provides a smooth coating, even on irregular and uneven surfaces.

SUMMARY OF THE INVENTION

In accordance with the present invention, a powder composition for making powder coatings comprises one or more than one curable polymer or resin and an agglomerate of a core-shell polymer, wherein the agglomerate of a core-shell polymer has an average particle size of from 5 to 190 microns, preferably from 10 to 127 microns. The powders in accordance with the present invention provide a cured powder coating that is flexible, smooth, and which may be applied in a thickness of only from 0.3 to 8 mils. Accordingly, the flexibilized powders of the present invention can be made from UV curable and thermally curable polymers or resins.

In a preferred embodiment of making a powder in accordance with the present invention, the agglomerate is cryoground to form a reduced agglomerate, followed by extruding said reduced agglomerate together with one or more than one curable polymer or resin and any additives to form an extrudate, and cooling and grinding said extrudate. Alternatively, the reduced agglomerate can be added as a post-blend additive to a cooled extrudate of resin or polymer, and additives, if any, followed by grinding the cooled extrudate and reduced agglomerate together.

The preferred core-shell polymer for use in accordance with the present invention comprises an acrylic impact modifier having a poly(methyl methacrylate) shell and a poly(butyl acrylate) core. Further, the preferred curable polymer or resin powder is an epoxy resin, wherein the powder composition is a low temperature curing one component powder composition which cures at from 107 to 149 degrees C.

DETAILED DESCRIPTION OF THE INVENTION

For the purpose of describing the proportions of components in the compositions of this invention, the term "resin" includes any resin or polymer per se, as well as the curing agent. Further, the term "one component coating powder" means that the powder is fully formed by grinding and screening only one extrudate of a mixture of the resin, curing agent, catalyst, and additives. A "two component coating powder" is formed by separately extruding one part of the coating and, optionally, extruding the second part of the powder, followed by co-grinding and screening the two parts.

As used herein, the "glass transition temperature" or Tg of any polymer may be calculated as described by Fox in *Bull. Amer. Physics. Soc.*, 1, 3, page 123 (1956). The Tg can also be measured experimentally using differential scanning calorimetry (rate of heating 20° C. per minute, Tg taken at the midpoint of the inflection). Unless otherwise indicated, the stated Tg as used herein refers to the calculated Tg.

As used herein, unless otherwise indicated, the phrase "per hundred parts resin" or "phr" means the amount, by weight, of an ingredient per hundred parts, by weight, of the total amount of polymer or resin contained in a coating powder, including cross-linking resins and curing agents.

In a preferred embodiment of the present invention, powder compositions comprise from 3 to 20 phr, preferably 5 to 15 phr, and 5–10 phr in post-blend applications, of impact modifiers comprising a cryoground agglomerate of core-shell polymers. Preferable core-shell polymers may comprise MBS (methacrylate-butadiene-styrene) impact modifiers and acrylic impact modifiers, wherein the core to shell weight ratio of the impact modifiers ranges from 70:30 to 96:4. Suitable impact modifiers have a primary average particle size of from 160 to 600 nm in diameter, as measured by laser light scattering.

Impact modifiers, in accordance with the present invention, have rubbery cores comprising styrene butadiene copolymers, and, preferably, have cores of poly (butyl acrylate) (BA) (co)polymers containing the reaction product of up to 20 weight % of C1–C8 alkyl (meth)acrylate comonomers. Core copolymeric comonomers should be selected to provide a core copolymer having a Tg of less than 20 degrees C.

In accordance with the present invention, impact modifier shells preferably comprise methyl methacrylate (MMA) homopolymers, but may also comprise MMA-co-ethyl acrylate copolymers, and crosslinked MMA polymers.

Commercially available impact modifiers for use in the present invention are EXL-2691A, which have a butadiene-styrene core and a cross-linked methyl methacrylate (MMA) shell; BTA-702, which have a butadiene-styrene core and MMA/ethyl acrylate (EA) shell; KM-334, EXL-2330, and KM-365, each of which have a butyl acrylate rubber copolymer core and an MMA shell. All listed impact modifiers are available from Rohm and Haas Company, Philadelphia, Pa.

Preferably, cryoground impact modifier agglomerate particles would have an average particle size range of from 5 to 190 um, more preferably, 10 to 130 um, even more preferably, 20 to 100 um, and yet even more preferably 30 to 90 um. The particle size ranges allow for smooth coatings spanning a coating thickness range of from 0.3 to 8 mils, preferably from 1 to 8, and more preferably from 2 to 7 mils. Smaller particles are more preferred than larger ones in any of the preceding ranges given, as they enable thinner smooth coatings without seeds being visible in the coating surface.

Resins useful in the present invention include those selected from the group consisting of one-component epoxy resins, two-component epoxy resins, UV curable resins, polyester resins, acrylic resins, polyester-acrylic hybrid resins, polyester-epoxy hybrid resins, silicon-containing resins, triglycidyl isocyanurate (TGIC)-containing resins, and combinations thereof. According to the present invention, one-component epoxy resins are preferred.

A wide range of applications are encompassed by the powder coatings in accordance with the present invention. Epoxy and UV curable resins comprise low temperature cure powder coatings. UV curable polyesters provide on-mold and in-mold coatings. Acrylic, polyester-acrylic hybrid resins and TGIC-containing resins according to the present invention provide may be used to provide weather resistant coatings which may, optionally, be UV cured. Silicon containing resins according to the present invention may be used to provide heat resistant coatings. All resins may be used alone or as a mixture of two or more thereof, depending upon the desired performance.

Epoxy resins which are suitable for the purposes of the one- and two-component low temperature cure powders of this invention may have an equivalent weight of from 100 to 700. Mixtures of such epoxy resins may be used. A suitable mixture may comprise an epoxy resin having an equivalent weight between 100 and 400 and one having an equivalent weight between 400 and 700 in a weight ratio of from 1:99 to 99:1. The resins are exemplified by, but not limited to, those produced by the reaction of epichlorohydrin and a bisphenol, e.g., bisphenol A and bisphenol F. The low melt viscosities of these resins facilitate the extrusion of them in admixture with a curing agent, additives and pigments at 160–220° F. According to the present invention, a suitable epoxy resin has a melt viscosity of from 200 to 2000 centipoise at 150° C., preferably from 300 to 1000 centipoise. Epoxy resins known as EPN (epoxy phenol novolac) and ECN (epoxy cresol novolac) resins and those made by the reaction of isopropylidenediphenol (bisphenol A) with epichlorohydrin are suitable for the purposes of this invention. Bisphenol A epoxies are sold under the trademarks ARALDITE® GT-7071, GT-7072, GT-6259, Ciba-Geigy, Tarrytown, N.Y., EPON® 1001 and EPON® 2042, Shell Chemicals, Inc. ARALDITE® GT-6259 is the trademark for an ECN resin.

The use of a crystalline epoxy may improve the flow characteristics of the fused coating powder and, therefore, the smoothness of the fused and cured coating. A particularly desirable flow is achieved when a crystalline epoxy constitutes from 5 to 20% by weight of the total amount epoxy resin used in the formulation of the powder, preferably 10% or less, by weight. A crystalline epoxy resin having an equivalent weight of 185 and sold by Shell under the trademark RSS 1407 is suitable for the purposes of this invention.

According to the present invention, low gloss UV curable coating powder resins comprise blends of one or more than one of each of a cationic curable resin and a free radical curing resin, together with photoinitiators effective to initiate polymerization, wherein the weight ratio of the cationic curable resin to free radical curable resin is 95:5 to 5:95. More particularly, low gloss luster can be achieved without the use of additives.

Cationic curable resins useful according to the present invention may generally comprise, for example, epoxides, vinyl ethers, oxetanes, oxolanes, cyclic acetals, cyclic lactones, thiiranes, or thiotanes, or combinations comprising at least one of the foregoing resins.

Preferably, the cationic curable resin comprises a polyglycidyl compound, such as a polyglycidyl ester or poly(β-methylglycidyl) ester, or a polyglycidyl ether or poly(γ-methylglycidyl) ether. Suitable commercial epoxide resins are exemplified by solid bisphenol A epoxy resins available under the trade names "GT-9013", from Vantico, and those epoxy resins disclosed as suitable for low temperature curable coating powders.

Suitable vinyl ethers according to the present invention may be the vinyl ether of an aliphatic, aromatic, cycloaliphatic, araliphatic or heterocyclic group, optionally further comprising one or more than one functional group such as ether, polyether, ester, polyester, urethane, polyurethane, or a combination comprising at least one of the foregoing groups or functional groups. Suitable vinyl ethers include, for example, commercial chain extended vinyl ethers include the Pluriol-E200 divinyl ether (PEG200-DVE), poly-THF290 divinylether (PTHF290-DVE) and polyethyleneglycol-520 methyl vinylether (MPEG500-VE) from BASF Corp. Also useful are hydroxyl-functionalized vinylethers, such as butanediol monovinylether.

Suitable oxetane compounds include, for example, trimethylene oxide. Suitable oxolane compounds include, for example, tetrahydrofuran or 2,3-dimethyltetrahydrofuran. Suitable cyclic acetal compounds include, for example, trioxane or 1,3-dioxolane. Suitable cyclic lactone compounds include, for example, beta-propionolactone or epsilon-caprolactone. Suitable thiirane compounds include, for example, ethylene sulfide, 1, 2-propylene sulfide or thioepichlorohydrin. Suitable thiotane compounds include, for example, 1,3-propylene sulfide or 3,3-dimethylthiothane.

According to the present invention, free radical curable resins generally have, on average, at least two ethylenically unsaturated groups per molecule bound, for example, to an oligomer or polymer, such as, a polyether, polyolefin, polyester, polycarbonate, (meth)acrylic, or polyurethane. Suitable free radical curable resins include, for example, unsaturated polyesters, (meth)acrylate-functional resins such as (meth)acrylourethanes, vinyl ethers, vinyl esters, allyl ethers, allyl esters, or combinations comprising at least one of the foregoing. Preferably one or more than one unsaturated polyester is used together with a resin having at least two sites of unsaturation per molecule, for example a poly(meth)acrylourethane resin, divinyl ether resin, divinyl ester resin, diallyl ether resin, diallyl ester resin, or combinations thereof, as a crosslinking agent. The prefix (meth)- as used herein means acrylate, methacrylate, and mixtures thereof.

Unsaturated polyesters comprise the condensation product of one or more than one of each of a polyol or diol and an unsaturated diacid or polyacid. Preferred unsaturated polyesters for UV cure systems include maleate diesters and fumarate diesters of oligomers or polymers consisting of glycols and mono or polybasic acids, and are solid materials at room temperature. The degree of unsaturation is typically 2 to 20 weight percent (wt. %), preferably 4 to 10 wt. %, based on the weight of the unsaturated polyester resin. Furthermore, the resins containing hydroxyl functional groups have a hydroxyl number of 5 to 100, while the resins containing acid functional groups have an acid number of 1 to 80.

In unsaturated polyesters according to the present invention, suitable ethylenically unsaturated di- or polyfunctional carboxylic acids (or their anhydrides) include, for example, maleic anhydride, fumaric acid, itaconic anhydride, citraconic anhydride, mesaconic anhydride, aconitic acid, tetrahydrophthalic anhydride, nadic anhydride, dimeric methacrylic acid, and the like.

Suitable glycols, diols or polyhydric alcohols include, for example, ethylene glycol, diethylene glycol, triethylene glycol, propanediol, butanediol, neopentyl glycol, cyclohexanedimethanol, hexanediol, 2-n-butyl-2-ethyl-1,3-propanediol, dodecanediol, bisphenol A, hydrogenated bisphenol A, trimethylol propane, pentaerythritol, and the like.

As is known, vinyl ether resins having at least two vinyl ether groups as described above may polymerize by either a cationic or free radical mechanism. Irrespective of actual mechanism, where the coating powder contains a cationic curable resin such as an epoxy, any vinyl ether resin present will be considered to form part of the free radical curable resin for the purposes of this invention. Although vinyl ether resins having at least two vinyl ether groups may be used alone as the free radical curable resin, they are more commonly used together with another free radical curable resin, preferably a (meth)acrylate-containing resin or an unsaturated polyester resin as described above. A divinyl ether resin useful in the present invention is URACROS® ZW 3307, from DSM, N.V., The Netherlands. Other suitable vinyl ether resins include, for example, divinyl ether terminated urethanes.

A wide variety of (meth)acrylate-functional resins are suitable as free radical curable resins, comprising, for example, an aliphatic, aromatic, cycloaliphatic, araliphatic or heterocyclic structure together with at least two (meth) acrylate groups. Exemplary useful structures are based on either monocylic phenols, for example on resorcinol or hydroquinone, or on polycyclic phenols, for example bisphenol F or bisphenol A. Methacrylate containing resins that further comprise unsaturated side chains, for example allyl, vinyl, or vinyl ether groups may be used.

In one preferred embodiment according to the present invention, a di(meth)acrylate terminate urethane is used in combination with the above-described unsaturated polyester resins. These resins find particular utility as crosslinking agents for free radical curable unsaturated polyester resins described above.

Allyl ester resins may also be employed, such as the reaction product of allyl alcohol and crystalline or non-crystalline carboxylic acids (or their anhydrides), typically phthalic anhydride. These resins find particular utility as crosslinking agents for the unsaturated polyester resins described above.

Suitable commercial embodiments of free radical curable resins include, for example, an unsaturated polyester resin commercially available under the trade name P-3125 from DSM, N.V., The Netherlands, and also under the trade name VAN-1743 from the Solutia; an acrylourethane resin commercially available under the trade name Viaktin 3546 from Solutia; PIOESTER 275, PIONEER P-1942, and P-1937, all from Pioneer Plastics, Auburn, Me.; ATLAC 363E, ATLAC 352, and DION 6694 ES, all from Reichold, Research Triangle Park, N.C.; and the unsaturated polyester resin available under the trade name Viaktin® 3890 from Solutia.

In a preferred in-mold or on-mold coating UV curable resin powder coating of the present invention, powders consist essentially of a reactive film-forming blend in particulate form of: a) an ethylenically unsaturated polyester resin; b) a copolymerizable cross-linking ethylenically unsaturated prepolymer, such as a difunctional allyl ester prepolymer or a difunctional vinyl ether urethane prepolymer; c) a thermal initiator; d) optional cure catalyst; and, e) a mold release agent, with the proviso that: i) the particulate blend is essentially free of any copolymerizable cross-linking ethylenically unsaturated monomers; and, preferably with the further proviso that: ii) either the unsaturated polyester resin contains at least one active hydrogen atom, or said particulate blend further consists essentially of a photoinitiator alongside the thermal initiator, or both. In the above on-mold coating method, if the coating powder includes a photoinitiator, prior to or following heating, the coating film is exposed to sufficient ultraviolet or ionizing radiation to effect radiation curing along the surface exposed to air. An example of an unsaturated polyester resin contains an active hydrogen atoms obtained by the condensation of an ethylenically unsaturated dicarboxylic acid and a diol possessing active hydrogen atoms, e.g., 1,4-cyclohexane dimethanol, to reduce air inhibition of cure at the exposed surface and improve flow out behavior at low temperatures.

Polyesters used in thermal cure systems according to the present invention may be formed in conventional manner from carboxylic acids (or their anhydrides) having acid functionalities of 2 or greater and polyols having hydroxyl functionalities of 2 or greater. Examples of suitable multifunctional carboxylic acids include benzene-1,2,4-tricarboxylic acid, phthalic acid, succinic acid, isophthalic acid, terephthalic acid, azelaic acid, maleic acid, trimesic acid, adipic acid, sebacic acid, and like carboxylic acids, Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols. In general, aromatic polyols and polyacids raise the Tg of a polyester, which preferably is a solid. For coating powders, the polyester resin used should have a glass transition temperature ($T_g$) of at least 320.degree. F. (160.degree. C.).

Hydroxyl functional polyesters useful in the invention have hydroxy equivalent weights between 200 and 2000.

Carboxylic acid functional polyesters useful in the invention have acid numbers of between 1000 and 2000.

For carboxylic acid functional polyesters, preferred curatives are multi-functional epoxies, triglycidal isocyanurate (TGIC) being a particularly preferred curative. The curative for cross-linking the polyester may be provided at a stoichiometry of between 0.7 and 1.3 relative to the reactive functional groups of the polyester resin.

The acrylic resins used in thermal cure systems according to the present invention should have a Tg of at least 45 degrees C., and typically have an ICI viscosity of between 30 and 80 poise. For processing to form the coating powder and for film forming, the acrylic polymer should have a typical softening point of 100 degrees C. or below. Suitable acrylic resins have acid numbers of between 20 and 100, preferably between 40 and 60. To avoid out-gassing, the hydroxyl number should be below 5, preferably zero or essentially zero. The acrylic resins are formed from typical acrylic monomers known in the art, such as methyl acrylate, methyl methacrylate, ethyl acrylate, acrylic acid, methacrylic acid, butyl acrylate, butyl methacrylate, etc. Styrene or alpha-methyl styrene monomers may also be incorporated, particularly to increase glass transition temperature of the acrylic copolymer.

The acid-reactive cross-linking agent or agents for the acrylic resin is added to between 70 and 110%, preferably between 80 and 100% of the stoichiometry of the acid functionality of the acrylic resin. A typical cross-linking agent for acid functionality is triglycidal isocyanurate (TGIC).

Hybrid coating powders according to the present invention comprise those in which thermally curable acrylic resin or polyester resin is blended with epoxy-functional resins, especially those derived from epichlorohydrin and bisphenol A. These coatings have many desirable properties, including good weatherability. Further, hybrid coating powders may comprise a blend of acrylic and polyester resins.

Silicone resins according to the present invention may be used to provide heat resistant coatings. The silicone resins useful in the present invention have a viscosity of between 500 and 10,000 cps at 150° C., preferably 2000 to 5000 cps, which gives appropriate melt-flow of the molten coating powder at the temperatures at which the coating powder is fused and cured. Further, the silicone resins of the present invention should be solid at room temperature and preferably have a Tg of 55° C. or above, preferably 60° C. or above.

Useful silicone resins according to the present invention comprise silicon atoms that are substituted with monovalent aryl or alkyl or alkylaryl hydrocarbon groups having from 1 to 24 carbons. In addition, silicone resin of the present invention self-condenses at high end-use temperatures, e.g., that of a barbecue grill or an automobile exhaust part. This requires silanol functionality (Si—O—H). The silicone resin of the present invention may have a condensable hydroxyl content of from 2 to 7 wt. %, more preferably from 3 to 5 wt. %. The condensable hydroxyl content should not be too high lest excess water outgasses during curing of the coating powder, resulting in foaming. On the other hand, the lower end of the condensable hydroxyl content range is important because below this the coating powder will cure too slowly to be suitable for commercial applications.

For heat stability, methyl and phenyl groups are the preferred monovalent hydrocarbons. Generally, the more phenyl groups, the higher the heat-resistance provided. The silicone resins compositions may include organo-siloxanes comprising units, including dimethyl, diphenyl, methylphenyl, phenylpropyl and their mixtures. Preferably, silicone resins of the present invention comprise random mixtures of methyl and phenyl groups, dimethyl siloxane and diphenyl siloxane groups, or phenyl-methylsiloxane groups, wherein the ratio of phenyl to methyl groups is 0.5 to 1.5:1, more preferably 0.7:1 to 1.1:1. Specifically, degree of substitution is defined as the average number of substituent organic groups per silicon atom and is the summation of the mole percent multiplied by the number of substituents for each ingredient.

To improve adhesion to a substrate, heat resistant powder coating resins according to the present invention may also comprise a blend of silicone resins with either polyester or acrylic resins in a weight ratio of from 100:0 to 10:90, preferably 90:10 to 40:60 silicone to polyester or acrylic.

In a one-component low temperature curing powder in accordance with the present invention, selection of a suitable powdered low temperature curing agent depends, among other things, upon the particle size, the melting or softening point and the reactivity of the curing agent. When epoxy resins having a $T_g$ of from 35° C. to 40° C., are used, sintering or blocking of the powder is avoided by pre-mixing the resin with a crystalline or non-crystalline curing agent powder having an average particle size such that the low temperature curing agent of the present invention that is capable of maintaining its own domain during extrusion.

In a preferred embodiment of low temperature cured powders according to the present invention, the curing agent, which is solid at 80° F., is powdered. A powdered curing agent does not react with a resin so readily as does the same curing agent in flake form, which allows a suitable powdered curing agent to retain its own domain during extrusion. Low temperature curing agents should have a sufficient average particle size so that they do not liquefy in the extruder and yet allow sufficient reactivity to cure at temperatures of 225 to 300° F. (107 to 149 deg. C). For example, a curing agent may desirably have an average particle size of 1 to 4 microns if the curing agent is active at a higher temperature. The average particle size of a powdered low temperature curing agent, as determined by laser light scattering, may range from 1 to 15 microns, preferably from 2 to 6 microns, and more preferably from 3 to 4 microns. A specific example of a curing agent that may so used in powdered form is sold under the trademark ANCAMINE® 2441, an epoxy resin adduct of an aliphatic polyamine sold by Air Products & Chemicals, which has an average particle size of from 3 to 4 microns.

The low temperature epoxy curing agent of this invention is one that will be active at a temperature of from 225 to 300° F. (107 to 149 degrees C.) and may be selected from among the many that are commercially available but an epoxy adduct of an aliphatic polyamine (including cycloaliphatic polyamines) having a primary, secondary, or tertiary amino group or a combination of such amino groups is a suitable curing agent for the purposes of this invention. Examples of such curing agents include hardeners sold under the trademarks PF LMB® 5218 (Ciba Geigy), ANCAMINE® 2337× S, ANCAMINE® 2014 AS, and ANCAMINE 2441® (Air Products & Chemicals). An epoxy adduct of an aromatic polyamine, such as methylene dianiline, is also a suitable curing agent for the purposes of this invention. It is preferred that the functionality of the adducting reaction mixture is 2 or less and it is particularly preferred to use a difunctional epoxy compound. The amount of low temperature curing agent is from 2 to 40 parts per hundred parts of the resin (phr) and the preferred amount is from 5 to 20 phr. Increasing levels of the curing agent reduce the gel time and, therefore, increase the orange peel effect.

Other types of epoxy curing catalysts that may be used in addition to low temperature curing agents in this invention may include tertiary amines, such as triethylamine diamine. A catalyst may be used at a level of from 0.1 to 5 parts per hundred parts of the resin (phr), preferably 0.2 to 2 phr to accelerate the curing reaction with the low temperature curing agent. Preferred catalysts for this invention are imidazoles and epoxy adducts thereof, the imidazoles having the general formula:

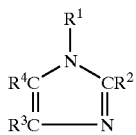

wherein $R^1$, $R^2$, $R^3$, and $R^4$ are independently hydrogen, alkyl, aryl, or any substituent which is not reactive with the epoxy resin. For the purposes of this invention, the term imidazole is used herein to mean both the substituted and unsubstituted imidazoles. Imidazoles, in themselves, tend to be insoluble in epoxy resins. Thus, epoxy adducts are made to make them more compatible with the epoxy system of this invention. Suitable adducts of such imidazoles with a bisphenol A epoxy resin are available commercially from Shell Chemical Company under its trademark EPON, e.g., EPON P-101, and also from Ciba-Geigy Corporation under its designation HT 261. Examples of suitable imidazoles include imidazole, 2-methyl imidazole, and 2-phenyl imidazole. For enhanced color stability, the 2-phenyl imidazole, which is available from the SWK Chemical Co., is preferred.

Various gloss levels for a cured epoxy coating may be achieved through the choice of epoxy resins, curing agents, curing catalysts and the relative amounts of each. A low gloss may be achieved, for example, by the use of a combination of dicyandiamide (a slow acting curing agent) and a fast acting agent to set up competitive reactions. A family of substituted ureas that are useful in latent one-pack systems with dicyandiamide is sold under the trademark OMICURE.

Curing temperatures for epoxy in the range of 110–140° C. (230–280° F.) may be achieved with one-pack systems comprising substituted ureas with dicyandiamide according to the present invention. Substituted ureas provided in the present invention may include phenyl dimethyl urea, toluene bis dimethyl urea, methylene bis (phenyl dimethyl) urea, and a cycloaliphatic bisurea designated U-35.

The choice of an epoxy or hydroxyl functional polyester curing agent for a low gloss coating in accordance with the present invention may be expanded by the use of acid-functional resins as matting agents in the formulation of the coating powders of this invention. For example, the P-101 imidazole/epoxy resin adduct named as a catalyst hereinabove may be used as a curing agent when such matting agents are used. An accelerated dicyandiamide sold as G 91 by Estron Chemical, Inc. may also be used as a curing agent at low temperatures in the presence of such matting agents to produce low gloss coatings. The OMICURE agents mentioned above may also be used in combination with said matting agents. Further, the amount of low temperature curing agent used in accordance with the present invention may be reduced somewhat in the presence of the acidic matting agents and this, too, has the effect of reducing gloss.

Still further, the smoothness attained by the incorporation of a crystalline epoxy resin, may also be attained in the absence of such a resin when a matting agent is used. Acidic matting agents may be part of one-component powder coatings and as additives in two-component powder coatings according to the present invention.

If a two-component system is desired, an extruded mixture of an epoxy resin and a catalyst, such as the imidazole as disclosed above, or an amount of a low temperature curing agent insufficient to cause substantial curing of the resin during extrusion is facilitated by the separate addition of said low temperature curing agent. From 0.1 to 8 parts by weight, per hundred parts resin, of a low temperature curing agent is generally insufficient to cause substantial curing of the resin during extrusion. The extruded mixture and the separately added low temperature curing agent, both being in powder form, are blended to form a coating powder.

Where a UV coating powder according to the present invention includes one or more than one cationic photoinitiator, suitable cationic photoinitiators include, for example, onium salts, aromatic diazonium salts of complex halides, certain metallocenes, or a combination comprising at least one of the foregoing initiators. More specific examples of suitable onium salts are diaryliodonium salts, triarylsulfonium salts. Suitable aromatic diazonium salts of complex halides, include, for example, 2,4-dichlorobenzenediazonium tetrachloroferrate(III). An example of visible light a cationic photoinitiator is ($\eta_5$-2,4-cyclopentadien-1-yl) ($\eta_6$-isopropylbenzene)-iron(II) hexafluorophosphate, available under the trade name IRGACURE 261 from Ciba-Geigy.

In order to increase the light efficiency, or to sensitize the cationic photoinitiator to specific wavelengths, it is also possible, depending on the type of initiator, to use sensitizers. Examples are polycyclic aromatic hydrocarbons or aromatic keto compounds, for example benzoperylene, 1,8-diphenyl-1,3,5,7-octatetraene, or 1,6-diphenyl-1,3,5-hexatriene. A factor in the choice of sensitizer is the nature and primary wavelength of the source of the radiation.

Suitable free radical UV or photoinitiators for use in the coating powder according to the present invention include, for example, alpha-cleavage photoinitiators, hydrogen abstraction photoinitiators, benzophenones, or acetophenone derivatives. Examples of radical photoinitiators useful in the present invention are 1-hydroxycyclohexyl phenylketone, available under the trade name IRGACURE 184®; 2,2-dimethoxy-2-phenyl acetophenone, available under the trade name IRGACURE 651®; or 4-(2-hydroxyethoxy)phenyl-2-hydroxy-2-methylpropane-1-one, available under the trade name IRGACURE® 2959, each from Ciba-Geigy, Tarrytown, N.Y. Suitable hydrogen abstraction photoinitiators include, for example, Michler's ketone, and a dimethoxy phenyl acetophenone photoinitiator available under the trade name IRGACURE® 651 from Ciba-Geigy.

In general, an effective quantity of catalyst in any UV curable resin or polymer according to the present invention is 0.1 to 10 phr, preferably 0.5 to 7.5 phr, and most preferably 1 to 3 phr. Alternatively, or in addition, the amount of the cationic photoinitiator and free radical photoinitiator may be adjusted based on the total amount of each type of resin in the coating powder. Thus, an effective amount of cationic photoinitiator is generally 0.1 to 10 phr, preferably 0.5 to 7.5 phr, and most preferably 1 to 5 parts by weight per hundred parts by weight of the total amount of the cationic curable resin. An effective amount of free radical photoinitiator is generally 0.1 to 10 phr, preferably 0.5 to 7.5 phr, and most preferably 1 to 3 parts by weight per hundred parts by weight of the total amount of the free radical curable resin.

In any UV curable coating powder, to enhance the cross-linking rate during cure, thermal catalysts may optionally be employed to assist in curing near the substrate, particularly when pigmented, opaque, or thick film coatings are desired. Suitable catalysts include, for example, peroxides, diacylperoxides, peroxy esters and peroxy carbonates, transition metal compounds based on fatty acids, oils, or tertiary amines, preferably cobalt soaps, such as cobalt octoate, cobalt neodecanoate, cobalt naphthenate, cobalt octadecanoate, and magnesium salts. An effective amount of catalyst depends upon the amount of cross-linking desired, types of free radical curable resins and cationic curable resins employed, and amounts of each polymer system in the coating powder. In general, an effective quantity of peroxide catalyst is 0.01 to 5 phr, preferably 0.05 to 3 phr, most preferably greater than or equal to 0.1 to 2 phr, or a range of 0.5 phr to 2 phr. In addition, effective quantities of metal catalyst are 0.01 to 1 phr, preferably 0.05 to 0.75 phr, and most preferably 0.1 0.5 phr, or 0.05 phr to 1 phr.

Thermal catalysts, such as cobalt soaps, find use in curing polyester, acrylic and all hybrid resins according to the present invention.

Silicone resins may be cured by heating to above 90 degrees c, and up to 200 degrees C., but such cure can also be catalyzed by Zn neodecanoate or Zn acetoacetate salts.

Additional components such as pigments, matting agents, fillers, flow control agents, dry flow additives, anticratering agents, surfactants, texturing agents, light stabilizers, matting agents, photosensitizers, wetting agents, anti-oxidants, plasticizers, opacifiers, stabilizers, and degassing agents can also be present.

Suitable pigments include, for example, titanium dioxide, iron oxide red, iron oxide yellow, phthalocyanine green, phthalocyanine blue, blue tone phthalocyanine green, yellow tone phthalocyanine green, green tone phthalocyanine blue, lamp black, carbon black, or combinations comprising at least one of the foregoing pigments. Suitable fillers include, for example, calcium carbonate, barium sulfate, wollastonite, mica, china clay, diatomaceous earth, benzoic acid, low molecular weight nylon, or combinations comprising at least one of the foregoing fillers. Titanium dioxide, in an amount of from 5 to 50 phr or more, is an example of a pigment that may be used. The amount of fillers and/or pigments in coating powders can be readily determined by one of ordinary skill in the art, depending upon the desired film opacity and coloration of the resultant coating. In general, effective quantities of fillers and/or pigments are 0 up to 120 phr, preferably 1 to 90 phr. In a preferred embodiment, the low gloss powder coatings are clear to translucent and contain an accordingly low proportion of pigment, e.g. from 0 to 60 phr, or they contain a clear to translucent filler, pigment or colorant in the amount of 0 to 120 phr.

A range of acidic matting agents may be used in accordance with the present invention. Polymers having an acid number of from 100 to 320 (mg KOH/g polymer as determined by the ASTM D 1639-90 method), preferably from 130 to 250, are useful in the present invention. The acidic matting agents of the present invention include those polymers having a Tg of from 55 to 75° C., that is, high enough so that the matting agent does not cause blocking or form salts with amine curing agents and low enough to that the matting agent will have a favorable effect on smoothness without causing an orange peel effect. Examples of such matting agents include, without limitation, an acrylic resin having an acid number of 142±5 sold as G 151 by Estron, a polyester having an acid number of 320 sold as EP-5600 by Ruco Polymer Corp., an acid-functional acrylic resin sold as SCX 880 by S. C. Johnson, and a low molecular weight, tetracarboxyl-functional polyester sold as DT 3357 by Ciba. The amount of matting agent is from 2 phr to 20 phr, preferably from 5 to 15 phr. The matting agents according to the present invention may be part of a one component thermosetting powder or, alternatively, they may be added as a solid or post-blend additive, i.e. which is ground into a thermosetting coating powder according to the present invention, e.g. after cooling the coating powder by comminuting them together.

An optical brightener, exemplified by 2,2'-(2,5-thiophenediyl)bis[5-t-butylbenzoxazole], sold under the trademark UVITEX OB, may be present at from 0.1 to 0.5 phr.

The coating powder may also contain a flow control agent in the range of from 0.5 to 2.0 phr. Examples of the flow control agents include the MODAFLOW poly(alkylacrylate) products, silicone resins, and the SUR-FYNOL acetylenic diols; they may be used singly or in combination. A suitable flow control agent for use in the present invention is RESIFLOW® P-67, an acrylate flow modifier, from Estron, Calvert city, Ky. Anti-oxidants may also be used at a concentration of from 0.5 to 2.0 phr to prevent the discoloration of the coatings even at the relatively low curing temperatures suitable for the purposes of this invention. Examples of the anti-oxidants that are useful in this invention include sodium hypophosphite, tris-(2,4-di-t-butyl phenyl) phosphite (sold under the trademark IRGAFOS 168), and calcium bis([monoethyl(3,5-di-t-butyl-4-hydroxybenzyl)phosphonate] (sold under the trademark IRGANOX 1425). Mixtures of anti-oxidants may be used.

Suitable dry flow additives include, for example, fumed silica, alumina oxide, and the like, or combinations comprising at least one of the foregoing dry flow additives. Suitable anticratering agents include, for example, benzoin, benzoin derivatives, low molecular weight phenoxy and phthalate plasticizers, and the like, or combinations comprising at least one of the foregoing anticratering agents. Suitable surfactants include, for example, acetylenic diol, and the like. Suitable texturing agents include, for example, organophilic clays, crosslinked rubber particles, and the like, or combinations comprising at least one of the foregoing texturing agents. Suitable light stabilizers include, for example, hindered amines, hindered phenols, or combinations comprising at least one of the foregoing light stabilizers. The amount of flow control agents, dry flow additives, anticratering agents, surfactants, texturing agents, and/or light stabilizers can be readily determined by one of ordinary skill in the art, depending upon the desired physical properties of the resultant coating. In general, effective quantities of flow control additives, dry flow additives, anticratering agents, texturing agents, surfactants, or light stabilizers are individually 1 to 15 phr.

Preferably, the components of the coating powder according to the present invention are utilized in the solid phase to avoid potential processing difficulties. To most effectively utilize photoinitiators, including any other components contained in solvent, these components undergo preliminary evaporation or other processing steps to convert these materials to powder or particulate form.

Except for the one- and two-component low temperature cure systems described above, the coating powder is produced using conventional techniques. In one exemplary manner of proceeding, each resin and additive is dry blended in the appropriate amounts. The mixture is then melt blended in an extruder with heating, preferably above the melting point but below the decomposition or reaction temperature of the resins. The extruded composition is rapidly cooled and broken into chips, and then ground, preferably with cooling. As necessary, the particulates are sorted according to size. Average particle size is typically 20 to 60 microns. Optionally, gaseous or supercritical carbon dioxide may be charged to the extruder, if necessary, to lower extrusion temperatures.

In a preferred embodiment of the present invention, the coating powder is jet milled or finely ground in an air classifying mill to an average particle size, as determined by laser light scattering, of 5 to 30 micrometers, preferably from 8 to 25 micrometers, more preferably 8 to 20 micrometers, and most preferably 8 to 16 micrometers for example by a Malvern Instruments APA-2000 Sizer unit. The small particle size provides exceptionally smooth coatings for use as translucent or clear coatings on hardwood substrates such as maple, oak, walnut, mahogany, or cherry. Further, the reduced particle size enables the provision of thinner coating films, having improved smoothness and reduced outgassing.

The coating powder may be applied to substrates by conventional means, including electrostatic fluidized beds, electrostatic spray guns, triboelectric guns, and the like, in which the powder coating particles are electrostatically charged and the substrate is grounded or oppositely charged. The substrate is heated (and may optionally be pre-heated prior to application), to aid the melt, flow, and coalescence of the particles.

After application to the substrate, the applied powder coating is cured, generally at a temperature of 200 to 500° F. (93 to 260° C.), preferably 220 to 450° F. (104 to 232° C.), more preferably 250 to 400° F. (121 to 204° C.). Where low curing temperatures are desired, for example with wood substrates, cure is generally less than 325° F. (163° C.), more preferably less than 300° F. (149° C.), even more preferably less than 250° F. (121° C.). Another advantage of the curable compositions is their ability to produce matte and low gloss finishes over a wide range of curing temperatures. For example, such finishes may be produced over the entire temperature range of 300° to 400° F., more preferably 250° F. to 400° F.

After it is coated on a substrate, a UV curable coating powder layer may be flowed out by exposure to infrared (IR) to create a coating having a more consistent profile. Next, the coating powder layer is exposed to an amount of heat effective to fuse (i.e., melt) the powders into a continuous, smooth, molten film. The substrate may also be heated at the time of application (pre-heated) and/or subsequently (post-heated) to effect heat fusion and film formation. Heating is performed in infrared, convection ovens, or a combination of both. When coating heat sensitive substrates, such as wood articles, pre-heat and post-heat steps are normally employed to enable faster melt and flow out. With plastic articles, only a post-heat step is usually performed to limit heat exposure and avoid plastic deformation. Generally, heat fusion proceeds for a time effective to outgas substrate volatiles, which prevents surface defects such as blisters, craters, and pinholes from forming during curing. Preferably, coated powders are heat fused for 10 seconds to 10 minutes, preferably 20 seconds to 5 minutes, and most preferably 30 seconds to 3 minutes. Shorter heat fusion times are needed as the temperature of heat fusion is increased. In accordance with the present invention, coated powders are heat fused at 120 to 350° F. (49 to 177° C.), preferably 150 to 300° F. (65 to-149° C.), and most preferably 180 to 270° F. (82 to 132° C.).

In the case of UV curable powder, after the coating powder is heat fused onto the substrate, it may be allowed to cool. It is then exposed to a radiation source effective to activate the photoinitiators, preferably both photoinitiators simultaneously. Preferably, exposure is to a standard ultraviolet light source, such as a standard medium pressure mercury-vapor lamp, iron doped mercury-vapor lamp, and/or gallium doped mercury-vapor lamp, e.g., 600-watt Fusion H-, D- and/or V-lamps, respectively, to rapidly cure the coating films into smooth, hard, low gloss finishes. Visible light or electron beam radiation may be used instead of UV radiation, if desired. Activation and cure of the free radical and cationic initiators in the coating typically takes 1 millisecond to 10 seconds, and typically less than 3 seconds, depending on the particular compositions and photoinitiators.

The powder of this invention may be used in coating heat sensitive substrates such as plastics, paper, cardboard and woods, as well as, glass, ceramics, and graphite-filled composites, metallic substrates such as steel and aluminum. For the purposes of this invention, wood is defined as any lignocellulosic material whether it comes from trees or other plants and whether it be in its natural form, milled, or made into plywood, particle board, or fiberboard of various densities. It is exemplified by lumber, hardwood, panels, molding, siding, oriented strand board, hardboard, and medium density fiberboard (MDF). The particle board may be standard or treated to enhance its electrical conductivity. Wood having a moisture content of from 3 to 10% by weight is suitable for the purposes of this invention.

Heat resistant powder compositions according to the present invention may be coated on steel, aluminized steel, aluminum, and various articles, particularly automobile or motorcycle exhaust systems, engine covers, engine cases, cylinders and cylinder heads, manifolds, mufflers, industrial exhaust systems and stacks, stoves, woodstoves, fireplaces, stovepipes, grills, ovens, barbecue grills and equipment, cooking utensils, boilers, kettles, furnaces, steam lines, heat exchangers and any surface routinely exposed to high heat for an extended time period.

Alternatively, the powder compositions of the present invention may be formed into a thin-film, laminate or, if formed adjacent a removable layer or layers, decalcomania.

EXAMPLE

Preparation of Cryoground Impact Modifier Particles

Actual

A butyl acrylate-core-MMA-shell impact modifier was submerged in liquid nitrogen in a small container. Using a ladel, the cold impact modifier/liquid nitrogen mixture was removed from the container and fed into a Kolaplex pinmill sample grinder (Manufactured by Alpine American). The ground impact modifier was then sieved through a 140 mesh screen and collected for use in powder coating formulations. Results of the grinding, as measured on a Mastersizer 2000 Particle Size Analyzer (laser light scattering), manufactured by Malvern Instruments, are shown in Table 1, below.

TABLE 1

Impact Modifier Particle Size

| Before Grinding | After Grinding |
|---|---|
| 10% < 80 um | 10% < 33 um |
| 50% < 188 um | 50% < 71 um |
| 90% < 384 um | 90% < 129 um |

Prophetic: Scale Up

In a continuous controlled feed mixture, 100 kg of the impact modifier would be submerged into liquid nitrogen and would be introduced into an Alpine pinmill, model CW-250 (manufactured by Alpine American). The ground material would then be sieved through a 140 mesh production screen.

Examples 1–12

Unless otherwise noted, all component amounts are expressed as parts by weight. Coating powders were prepared in accordance with Tables 2 or 3 below by initially blending by hand for 1 minute all components except the fumed alumina or fumed silica. The blend was then melt mixed in a 30 mm twin screw Baker Perkins extruder having a front zone maintained at 180° F. and an unheated rear zone. The extrudate was then chipped and ground with a dry flow aid to a fine powder that passed through a 140 mesh screen (U.S. Standard). The coating powders were applied to a substrate preheated at 375 degrees F. (192 degrees C.) for 10 minutes as defined below by electrostatic spray and were cured at 192 degrees C. for 5 minutes.

Mandrel Bend Test: Coated metallic substrates are bent over mandrels of decreasing diameter until failure (defined as cracking of the coating) occurs. Values reported in tables 2 and 3 are the diameter in inches of the smallest mandrel which does NOT result in failure, and are the average of three measurements. Thus, decreasing mandrel size represents increasing coating flexibility. This is observed for examples 3,6, and 7 in Table 2 and examples 9, 11, and 12 in Table 3. Aside from the CTBN-containing powder coating composition (example 4), inclusion of a core-shell impact modifier results in a coating with flexibility equal to (example 8) or better (all other examples) than a control lacking such a modifier.

Tensile measurements: Free films were prepared by spraying coating powder and curing on steel that had been coated with a fluoropolymer release spray. The films were cut into 19 mm×76 mm strips. These strips were then tested on a Tinius-Olsen H10K-S bench top universal tester. The values in tables 2 and 3 are the average of 7 measurements.

TABLE 2

| | Example No. | | | | | | |
|---|---|---|---|---|---|---|---|
| | 1 (Control) | 2 | 3 | 4 | 5 | 6 | 7 |
| Component | | | | | | | |
| Bisphenol A epoxy resin | 95 | 95 | 95 | 45 | 95 | 95 | 95 |
| Bisphenol A epoxy resin (crystalline) | 5 | 5 | 5 | 5 | 5 | 5 | 5 |
| Acrylic flow aid | 1 | 1 | 1 | 1 | 1 | 1 | 1 |
| Wax | 1 | 1 | 1 | 1 | 1 | 1 | 1 |
| Titanium dioxide pigment | 25 | 25 | 25 | 25 | 25 | 25 | 25 |
| Yellow iron oxide pigment | 0.001 | 0.001 | 0.001 | 0.001 | 0.001 | 0.001 | 0.001 |
| Carbon Black pigment | 0.007 | 0.007 | 0.007 | 0.007 | 0.007 | 0.007 | 0.007 |
| Aluminosulfosilicate pigment | 0.001 | 0.001 | 0.001 | 0.001 | 0.001 | 0.001 | 0.001 |
| Acid functional acrylic resin | 15 | 15 | 15 | 15 | 15 | 15 | 15 |
| Amine Curing Agent | 7 | 7 | 7 | 7 | 7 | 7 | 7 |
| Antioxidant | 1.2 | 1.2 | 1.2 | 1.2 | 1.2 | 1.2 | 1.2 |
| Glass beads | 5 | 5 | 5 | 5 | 5 | 5 | 5 |
| Optical Brightener | 0.01 | 0.01 | 0.01 | 0.01 | 0.01 | 0.01 | 0.01 |
| Imidazole catalyst | 0.5 | 0.5 | 0.5 | 0.5 | 0.5 | 0.5 | 0.5 |
| MMAx-link//MBS | — | 17 | — | — | — | — | — |
| MMA//BA (600 nm)[2] | — | — | 17 | — | — | — | — |
| CTBN[1] | — | — | — | 50 | — | — | — |
| MMA//BA (300 nm)[2] | — | — | — | — | 17 | — | — |
| MMA//BA (160 nm)[2] | — | — | — | — | — | 17 | — |
| MMA/EA//MBS | — | — | — | — | — | — | 17 |
| Dry flow aid | 0.5% | 0.5% | 0.5% | 0.5% | 0.5% | 0.5% | 0.5% |
| Aluminum Oxide dry flow aid | 0.3% | 0.3% | 0.3% | 0.3% | 0.3% | 0.3% | 0.3% |
| Properties | | | | | | | |
| Mandrel Bend (in.) | 2.3750 | 1.8750 | 0.7500 | 3.0000 | 1.3125 | 0.7500 | 0.75000 |
| Tensile Strength | | | | | | | |

[1]Carboxy terminated, acrylonitrile-butadiene reactive oligomer) rubber;
[2]Primary particle size.

TABLE 3

| Component | 1 (Control) | 8 | 9 | 10 | 11 | 12 |
|---|---|---|---|---|---|---|
| Bisphenol A epoxy resin | 95 | 95 | 95 | 95 | 95 | 95 |
| Bisphenol A epoxy resin (crystalline) | 5 | 5 | 5 | 5 | 5 | 5 |
| Acrylic flow aid | 1 | 1 | 1 | 1 | 1 | 1 |
| Wax | 1 | 1 | 1 | 1 | 1 | 1 |
| Titanium dioxide pigment | 25 | 25 | 25 | 25 | 25 | 25 |
| Yellow iron oxide pigment | 0.001 | 0.001 | 0.001 | 0.001 | 0.001 | 0.001 |
| Carbon Black pigment | 0.007 | 0.007 | 0.007 | 0.007 | 0.007 | 0.007 |
| Aluminosulfosilicate pigment | 0.001 | 0.001 | 0.001 | 0.001 | 0.001 | 0.001 |
| Acid functional acrylic resin | 15 | 15 | 15 | 15 | 15 | 15 |
| Amine Curing Agent | 7 | 7 | 7 | 7 | 7 | 7 |
| Antioxidant | 1.2 | 1.2 | 1.2 | 1.2 | 1.2 | 1.2 |
| Glass beads | 5 | 5 | 5 | 5 | 5 | 5 |
| Optical Brightener | 0.01 | 0.01 | 0.01 | 0.01 | 0.01 | 0.01 |
| Imidazole catalyst | 0.5 | 0.5 | 0.5 | 0.5 | 0.5 | 0.5 |
| MMAx-link//MBS | — | 8.5 | — | — | — | — |
| MMA//BA (600 nm)$^2$ | — | — | 8.5 | — | — | — |
| CTBN$^1$ | 8.5 | — | — | — | — | — |
| MMA//BA (300 nm)$^2$ | — | — | — | 8.5 | — | — |
| MMA//BA (160 nm)$^2$ | — | — | — | — | — | 8.5 |
| MMA/EA//MBS | — | — | — | — | 8.5 | |
| Dry flow aid | 0.5% | 0.5% | 0.5% | 0.5% | 0.5% | 0.5% |
| Aluminum Oxide dry flow aid | 0.3% | 0.3% | 0.3% | 0.3% | 0.3% | 0.3% |
| Properties | | | | | | |
| Mandrel Bend (in.) | 2.3750 | 2.3750 | 1.3125 | 1.8750 | 1.3125 | 1.3125 |
| Tensile Strength | | | | | | |

As shown by Mandrel Bend test results above examples demonstrate unexpectedly improved flexibility as compared to CTBN rubber containing powder coatings. Accordingly, the coatings of the present invention reduce cracking in coatings formed from low temperature curable powders.

We claim:

1. A powder composition comprising one or more than one curable polymer or resin and an agglomerate of a core-shell polymer, wherein the agglomerate of a core-shell polymer has an average particle size of from 5 to 190 microns,
   further wherein, the said polymer or resin is chosen from epoxy resins, silicon-containing resins, vinyl ethers, oxetanes, oxolanes, cyclic acetals, cyclic lactones, thiiranes, thiotanes, or ultraviolet (UV) curable resins,
   still further wherein, when the said polymer or resin comprises UV curable resins, the said powder composition further comprises a photoinitiator, and
   yet still further wherein, when the said polymer or resin comprises epoxy resins,
   (i) the said epoxy resins comprise a mixture of an epoxy resin having an equivalent weight between 100 and 400 and one having an equivalent weight of between 400 and 700;
   (ii) the said epoxy resins further comprise a crystalline epoxy;
   (iii) the said powder coating composition further comprises an epoxy adduct of an aliphatic or aromatic polyamine or, alternatively, a combination of dicyandiamide and a substituted urea chosen from phenyl dimethyl urea, toluene bis dimethyl urea, methylene bis (phenyl dimethyl) urea, and cycloaliphatic bisurea, or
   (iv) the said powder coating composition further comprises an acidic matting agent.

2. A powder composition as claimed In claim 1, wherein said core-shell polymer comprises an acrylic impact modifier having a poly(methyl methacrylate) shell and a poly (butyl acrylate) core.

3. A powder composition as claimed in claim 1, wherein said curable polymer or resin is an epoxy resin, and further wherein said powder composition is a one component composition which cures at from 107 to 149 degrees C.

4. A powder composition as claimed in claim 1, wherein said agglomerate of a core-shell polymer has an average particle size of from 10 to 127 microns.

5. A powder composition comprising a curable polymer or resin and an agglomerate of a core-shell polymer, wherein said agglomerate is cryoground,
   further wherein, the said polymer or resin is chosen from epoxy resins, silicon-containing resins, vinyl ethers, oxetanes, oxolanes, cyclic acetals, cyclic lactones, thiiranes, thiotanes, or ultraviolet (UV) curable resins,
   still further wherein, when the said polymer or resin comprises UV curable resins, the said powder composition further comprises a photoinitiator, and yet still further wherein, when the said polymer or resin comprises epoxy resins,
  (i) the said epoxy resins comprise a mixture of an epoxy resin having an equivalent weight between 100 and 400 and one having an equivalent weight of between 400 and 700;
  (ii) the said epoxy resins further comprise a crystalline epoxy;
  (iii) the said powder coating composition further comprises an epoxy adduct of an aliphatic or aromatic polyamine or, alternatively, a combination of dicyandiamide and a substituted urea chosen from phenyl dimethyl urea toluene bis dimethyl urea, methylene bis (phenyl dimethyl) urea, and cycloaliphatic bisurea, or
  (iv) the said powder coating composition further comprises an acidic matting agent.

6. A method of powder coating a substrate with a powder as claimed in claim 1 comprising applying said powder to a substrate to form a coating and curing said coating.

7. A method of powder coating a substrate with a powder as claimed in claim 2 comprising applying said powder to a substrate to form a coating and curing said coating.

8. A method of making a powder as claimed in claim 1 for powder coatings comprising cryogrinding said agglomerate to form a reduced agglomerate, extruding said reduced agglomerate together with one or more than one curable polymer or resin to form an extrudate, and cooling and grinding said extrudate.

9. A smooth powder coating on a substrate made from the powder as claimed in any one of claims 1 to 5, wherein the coating has a thickness of from 0.3 to 8 mils.

10. A smooth powder coating on a substrate made from the powder as claimed in claim 9, wherein the substrate Is selected from the group consisting of plastics, wood, paper, and cardboard.

\* \* \* \* \*

UNITED STATES PATENT AND TRADEMARK OFFICE
CERTIFICATE OF CORRECTION

PATENT NO.    : 6,861,475 B2
DATED         : March 1, 2005
INVENTOR(S)   : Ilenda et al.

It is certified that error appears in the above-identified patent and that said Letters Patent is hereby corrected as shown below:

Column 6,
Line 63, cancel "For coating powders, the polyester resin used should have a glass transition temperature (T.sub.g) of at least 320.degree.F (160 degree. C..)."

Column 7,
Lines 4 and 9, change "triglycidal" to -- triglycidyl --
Line 59, cancel "as sold G 91 by Estron Chemical, Inc."

Signed and Sealed this

Twenty-fourth Day of May, 2005

JON W. DUDAS
*Director of the United States Patent and Trademark Office*